(12) United States Patent
Burley et al.

(10) Patent No.: US 9,053,582 B2
(45) Date of Patent: Jun. 9, 2015

(54) STREAMING LIGHT PROPAGATION

(75) Inventors: Brent Burley, Monterey Park, CA (US); Andrew Selle, Montrose, CA (US); Christian Eisenacher, Burbank, CA (US); Gregory Nichols, North Hollywood, CA (US)

(73) Assignee: Disney Enterprises, Inc., Burbank, CA (US)

( * ) Notice: Subject to any disclaimer, the term of this patent is extended or adjusted under 35 U.S.C. 154(b) by 370 days.

(21) Appl. No.: 13/493,948

(22) Filed: Jun. 11, 2012

(65) Prior Publication Data

US 2013/0329107 A1  Dec. 12, 2013

(51) Int. Cl.
*G06T 15/50* (2011.01)

(52) U.S. Cl.
CPC .................... *G06T 15/506* (2013.01)

(58) Field of Classification Search
None
See application file for complete search history.

(56) References Cited

U.S. PATENT DOCUMENTS

| | | | |
|---|---|---|---|
| 5,045,995 A | 9/1991 | Levinthal | |
| 5,923,330 A | 7/1999 | Tarlton | |
| 6,016,150 A | 1/2000 | Lengyel | |
| 6,300,965 B1 | 10/2001 | Sowizral | |
| 6,326,964 B1 | 12/2001 | Snyder | |
| 6,496,601 B1 | 12/2002 | Migdal | |
| 6,714,936 B1 | 3/2004 | Nevin | |
| 7,095,409 B2 | 8/2006 | Cook | |
| 7,129,940 B2 | 10/2006 | Cook | |
| 7,168,074 B1 | 1/2007 | Srinivasa | |
| 7,289,119 B2 | 10/2007 | Heirich | |
| 7,675,518 B1 | 3/2010 | Miller | |
| 7,783,695 B1 | 8/2010 | Tyrrell | |
| 8,106,906 B1 | 1/2012 | Duff | |
| 8,174,524 B1 | 5/2012 | Laur | |
| 8,217,949 B1 | 7/2012 | Carpenter | |
| 8,400,447 B1 | 3/2013 | Carr | |
| 8,411,082 B1 | 4/2013 | Cook | |
| 8,416,260 B1 | 4/2013 | Carpenter | |
| 8,436,856 B1 | 5/2013 | Duff | |
| 8,436,867 B1 | 5/2013 | Duff | |

(Continued)

OTHER PUBLICATIONS

Crassin, C. et al.: "Interactive Indirect Illumination Using Voxel Cone Tracing", Pacific Graphics 2011, vol. 30, No. 7, 2011, 10 pages, Retrieved from the Internet: <URL:https//research.nividia.com/sites/default/files/publicatins/GIVoxels-pg2011-authors.pdf>.

(Continued)

*Primary Examiner* — Said Broome
(74) *Attorney, Agent, or Firm* — Farjami & Farjami LLP

(57) ABSTRACT

A method is provided for streaming light propagation with particular application for feature films and other demanding content creation using scenes of high complexity requiring art directed global illumination. By attaching a data recording shader or equivalent functionality to any tracing based renderer that can provide multi-pass global illumination, the complete set of light bounce propagation records and the set of emissive samples for a particular rendering can be recorded to memory or disk. A user may edit the emissive samples to adjust the lighting environment, including modifying light source color and intensity and even moving and adding new emissive samples. To relight the scene, the edited emissive samples are processed through the propagation records using a streaming multiply-and-add operation amenable to high levels of parallelization, avoiding a costly re-rendering of the scene and providing a final quality result in interactive time.

20 Claims, 3 Drawing Sheets

(56) References Cited

U.S. PATENT DOCUMENTS

| | | | |
|---|---|---|---|
| 8,466,919 | B1 | 6/2013 | Duff |
| 8,493,383 | B1 | 7/2013 | Cook |
| 2002/0050990 | A1 | 5/2002 | Sowizral |
| 2005/0146522 | A1 | 7/2005 | Maillot |
| 2005/0243086 | A1 | 11/2005 | Schechter |
| 2006/0209067 | A1* | 9/2006 | Pellacini et al. ............. 345/426 |
| 2007/0262988 | A1 | 11/2007 | Christensen |
| 2008/0180440 | A1 | 7/2008 | Stich |
| 2009/0225081 | A1 | 9/2009 | Keller |
| 2009/0262132 | A1 | 10/2009 | Peterson |
| 2010/0231589 | A1 | 9/2010 | Salsbury |
| 2012/0147015 | A1 | 6/2012 | Rogers |
| 2013/0016107 | A1 | 1/2013 | Dharmapurikar |
| 2014/0285499 | A1 | 9/2014 | Iwasaki |

OTHER PUBLICATIONS

Arvo, J.: "Fast Ray Tracing by Ray Classification", ACM, 2 Penn Plaza, Suite 701—New York USA, vol. 21, No. 4, Jul. 1987 10 pages.

Amanatides, J.: "Ray tracing with cones" Computers and Graphics, Elsevier, GB, vol. 18, No. 3, Jul. 1, 1984, pp. 129-135, 7 pages.

Wald, I. et al: "Interactive Global Illumination using Fast Ray Tracing", ACM, 2 Penn Plaza, Suite 701—New York USA, 2002 11 pages.

Wikipedia: "Stencil Buffer", Apr. 3, 2012, Retrieved from the Internet: <URL:http://en.wikipedia.org/w/index.php?title=Stencil_buffer&oldid=485283047>2 pages.

EESR dated Feb. 7, 213 re Application No. 13160552.9.

Áfra, A., "Incoherent Ray Tracing without Acceleration Structures", Eurographics 2012 Short Paper, 4 pages.

Aila et al. 2010. Architecture considerations for tracing incoherent rays. In *Proceedings of the Conference on High Performance Grahics* (HPG '10). Eurographics Association, Aire-la-Ville, Switzerland, Switzerland, 113-122.

Arvo et al., Fast ray tracing by ray classification, Proceedings of the 14th annual conference on Computer graphics and interactive techniques, p. 55-64, Aug. 1987 [doi>10.1145/37401.37409].

Benthin et al., Combining Single and Packet-Ray Tracing for Arbitrary Ray Distriubtions on the Intel MIC Architecture, IEEE Transactins on Visualization and Computer Graphics, v.18 n.9, p. 1438-14.

Bikker, J., Improving Data Locality for Efficient In-Core Path Tracing, Computer Graphics Forum, v.31 n.6, p. 1936-1947, Sep. 2012 [doi>10.1111/j.1467-8659.2012.03073.x].

Boulos et al.: Adaptive ray packet reodering. In *Proc. of Interactive Ray Tracing* (2008).

Budge et al.: Out-of-core data management for path tracing on hybrid resources. In *Computer Graphics Forum* (2009).

Christensen et al., "Ray Tracing for the Movie 'Cars'", Interactive Ray Tracing 2006, IEEE Symposium, Sep. 18-20, 2006, pp. 1-6.

Crassin et al. (2011), Interactive Indirect Illumination Using Voxel Cone Tracing. Computer Graphics Forum, 30: 1921-1930. doi: 10.1111/j.1467-8659.2011.02063.x.

Dammertz et al., Shallow bounding volume hierarchies for fast SIMD ray tracing of incoherent rays, Proceedings of the Nineteenth Eurographics conference on Rendering, Jun. 23-25, 2008, Sarajevo, Bosnia and Herzegovina.

Ernst et al.: Multi bounding volume hierarchies. In Proc. of Interactive Ray Tracing (2008).

Garanzha et al.: Fast ray sorting and breadth-first packet traversal for GPU ray tracing. *Computer Graphics Forum* (2010).

Gribble et al.: Coherent ray tracing via stream filtering. In *Proc. of Interactive Ray Tracing* (2008).

Hanika et al., Two-level ray tracing with reordering for highly comlex scenes, Porceedings of Graphics Interface 2010, May 31-Jun. 2, 2012, Ottawa, Ontario, Canada.

Hanrahan, P., Using caching and breadth-first search to speed up ray-tracing, Proceedings on Graphics Interface '86/Vision Interface '86, p. 56-61, Aug. 1986, Vancouver, British Columbia, Canada.

Hoberock et al., Stream compaction for deferred shading, Proceedings of the Conference on High Performance Graphics 2009, Aug. 1-3, 2009, New Orleans, Louisana [doi>10.1145/1572769.1572797].

Kato et al., "Parallel Rendering and the Quest for Realism: The 'Kilauea' Massively Parallel Ray Tracer", Practical Parallel Processing for Today's Rendering Challenges, SIGGRAPH 2001, Course Note #40, ACM, Aug. 2001, Los Angeles, USA, Aug. 12-17, 1 p.

Kato, T., "Kilauea": parallel global illumination renderer, Proceedings of the Fourth Eurographics Workshop on Paralle Graphics and Visualization, Sep. 9-10, 2002, Blaubeuren, Germany.

Keller et al., "Efficient Ray Tracing without Auxiliary Acceleration Data Structure", HPG 2011, 1 page.

Moon et al., Cache-oblivious ray reordering, ACM Transactions on Graphics (TOG), v.29 n.3, p. 1-10, Jun. 2010 [doi>10.1145/1805964.18005972].

Nakamaru et al., Breadth-First Ray Tracing Utilizing Uniform Spatial Subdivision, IEEE Transactions on Visualization and Computer Graphics, v.3 n.4, p. 316-328, Oct. 1997 [doi>10.1109/2945.646235].

Navratil et al., Dynamic Ray Scheduling to Improve Ray Coherence and Bandwidth Utilization, Proceedings of the 2007 IEEE Symposium on Interactive Ray Tracing, p. 95-15, Sep. 10-12, 2007 [doi>10.

Overbeck et al.: Large ray packets for real-time Whitted ray tracing. In *Proc. of Interactive Ray Tracing* (2008).

Pantaleoni et al., PantaRay: fast ray-traced occlusion cacing of massive scenes, ACM Transactions on Graphics (TOG), v.29 n.4, Jul. 2010 [doi>10.1145/1778765.1778774].

Pharr et al., Rendering complex scenes with memory-coherent ray tracing, Proceedings of the 24th annual conference on Computer graphics and interactive techniques, p. 101-108, Aug. 1997 [doi>10.1145/258734.2587.

Ramani et al., 2009. StreamRay: a stream filtering architecture for coherent ray tracing. *SIGPLAN* Not. 44, 3 (Mar. 2009), 325-336. DOI=10.1145/1508284.1508282 http://doi.acm.org/10.1145/1508284.1508282.

Reinhard et al., Hybrid scheduling for parallel rendering using coherent ray tasks, Proceedings of the 1999 IEEE symposium on Parallel visualization and graphics, p. 21-28, Oct. 25-26, 1999, San Francisco, California.

Reshetov et al., Multi-level ray tracing algorithm, ACM Transactions on Graphics (TOG), v.24 n.3, Jul. 2005 [doi>10.1145/1073204.1073329].

Tsakok, J., Faster incoherent rays: Multi-BVH ray stream tracing, Proceedings of the Conference on High Performance Graphics 2009, Aug. 1-3, 2009, New Orleans, Louisiana [doi>10.1145/1572769.1572793].

Wald et al. "SIMD Ray Stream Tracing—SIMD Ray Traversal with Generalized Ray Packets and On-the-fly Re-Ordering." *Infrome Técnico, SCI Institute* (2007).

Wald et al., Interactive distributed ray tracing of highly complex models Proceedings of the 12th Eurographics conference on Rendering. Jun. 1, 2001, London, UK [doi>10.2312/EGWR/EGWR01/277-288].

Wald et al.: Getting rid of packets: efficient SIMD single-ray traversal using multi-branching BVHs. In Proc. of Interactive Ray Tracing (2008).

U.S. Appl. No. 12/043,041, filed Mar. 5, 2008, Titled "Multiheading in Rendering", First Named Inventor: Fong.

U.S. Appl. No. 12/120,711, filed May 15, 2008, Titled "Lagrangian Filtering", First Named Inventor: Carpenter.

U.S. Appl. No. 12/533,965, filed Jul. 31, 2009, Titled "System and Methods for Implementing Object Oriented Structures in a Shading Language", First Named Inventor: Duff.

U.S. Appl. No. 13/280,258, filed Oct. 24, 2011, Titled "Programmable System for Artistic Volumetric Lighting", First Named Inventor: Nowrouzezharai.

* cited by examiner

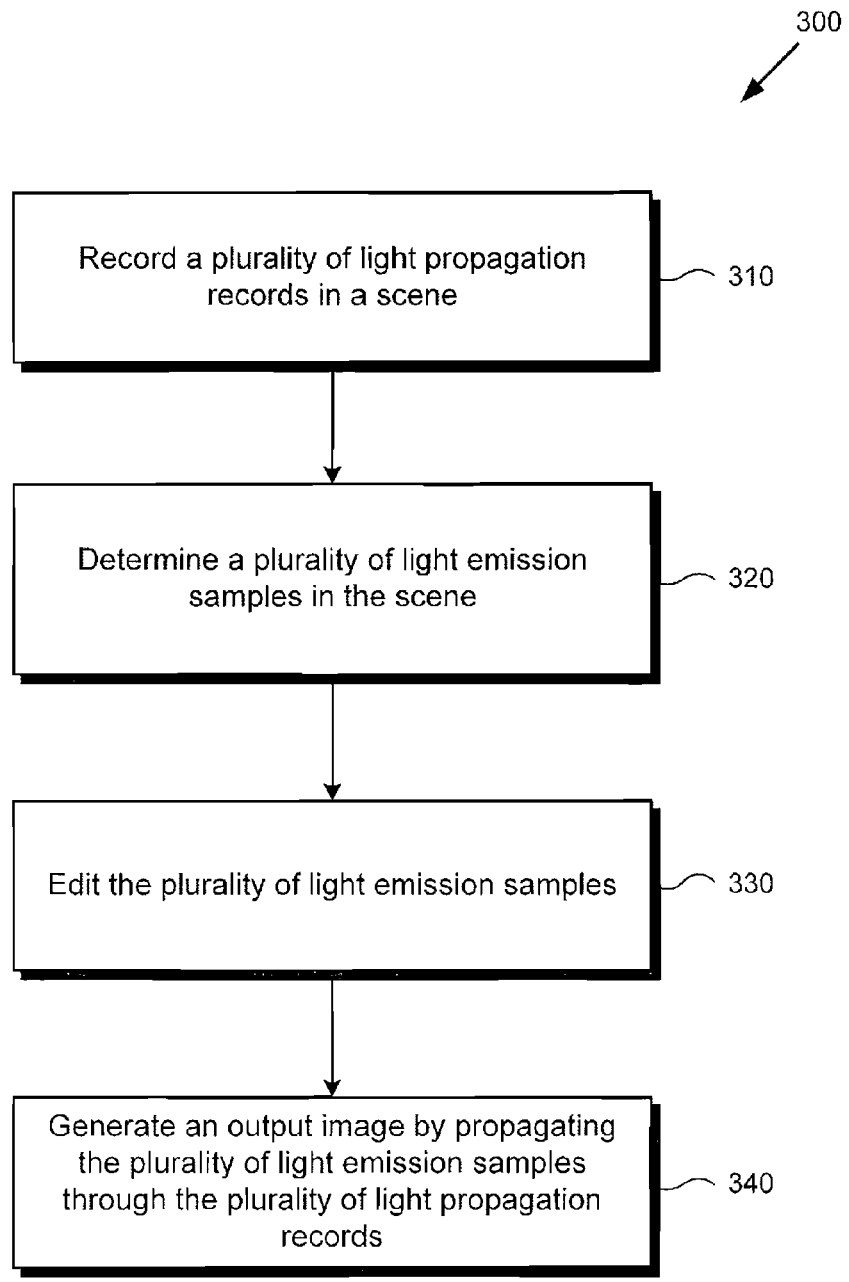

STREAMING LIGHT PROPAGATION

BACKGROUND

Realistic lighting is an important component of high quality computer rendered graphics. By utilizing a renderer employing a global illumination model, scenes can be provided with convincing reflections and shadows, providing the requisite visual detail demanded by feature length animated films and other content. Conventionally, a ray tracing renderer may be utilized to provide global illumination in a simple manner.

SUMMARY

The present disclosure is directed to streaming light propagation, substantially as shown in and/or described in connection with at least one of the figures, as set forth more completely in the claims.

BRIEF DESCRIPTION OF THE DRAWINGS

FIG. 3 presents an exemplary flowchart illustrating a method for providing streaming light propagation.

DETAILED DESCRIPTION

Figure 1:
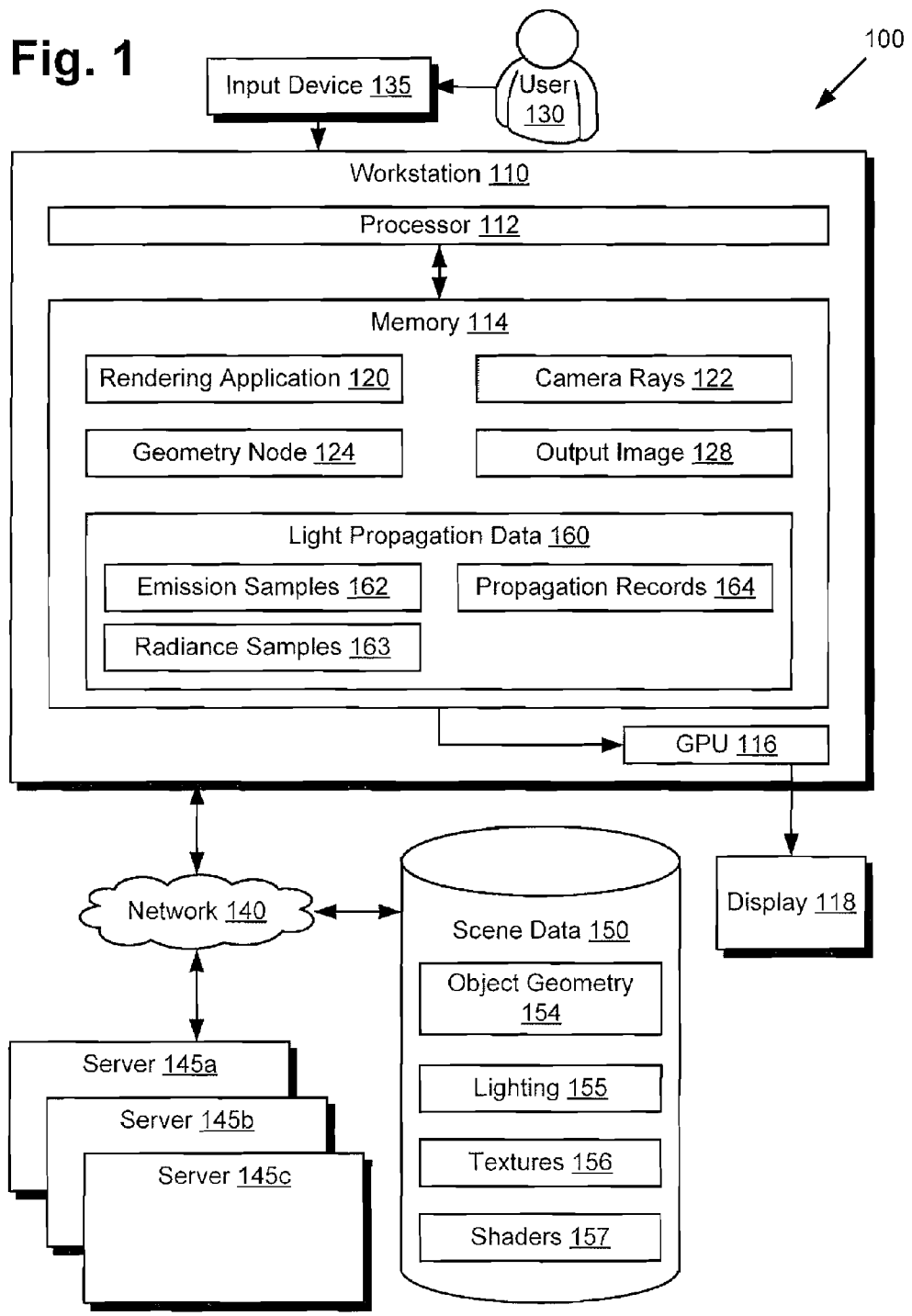
FIG. 1 presents an exemplary diagram of a system for providing streaming light propagation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

With large processing overhead and highly random data access requirements, ray tracing becomes less suitable for complex scenes with larger amounts of data, as required by feature films and other challenging applications. Moreover, to provide lighting environments that are artistically driven and visually attractive, artists and directors require interactive visualization of lighting changes. A conventional ray tracer requires the entire scene to be re-rendered again to show the result of any lighting changes, a time consuming and resource intensive process that may not be reasonably accommodated within a production budget. While techniques such as renderer state caching and screen-space data structures may assist in accelerating the re-rendering process, such approaches are often only limited to specific portions of the scene and can only provide a lower quality visualization compared to a final quality rendering.

Accordingly, FIG. 1 presents an exemplary diagram of a system for providing streaming light propagation. Diagram 100 of FIG. 1 includes workstation 110, display 118, user 130, input device 135, network 140, servers 145a, 145b and 145c, and scene data 150. Workstation 110 includes processor 112, memory 114, and graphics processing unit (GPU) 116. Memory 114 includes rendering application 120, camera rays 122, geometry node 124, output image 128, and light propagation data 160. Light propagation data 160 includes emission samples 162, radiance samples 163, and propagation records 164. Scene data 150 includes object geometry 154, lighting 155, textures 156, and shaders 157.

Workstation 110 may be any computing device such as a rackmount server, desktop computer, or mobile computer. User 130 may utilize input device 135, for example a keyboard and mouse, to direct the operation of rendering application 120 executing in memory 114 of processor 112. Rendering application 120 may process scene data 150 received from network 140 to generate a rendered output image 128 for output to display 118 through GPU 116. Network 140 may be a high speed network suitable for high performance computing (HPC), for example a 10 GigE network or an InfiniBand network. Once completed, output image 128 may also be copied to non-volatile storage, not shown in FIG. 1.

For simplicity, it is assumed that output image 128 is only a single frame and that object geometry 154 already includes the positioning of all objects within the scene for the associated frame. However, in alternative implementations, scene data 150 may further include motion data for object geometry 154, in which case several animation frames may be rendered by rendering application 120. Moreover, some implementations may render multiple frames of the same scene concurrently, for example to provide alternative camera angles or to provide stereoscopic rendering. Lighting 155 may include the properties of all light sources within the scene. Textures 156 may include all textures necessary for object geometry 154. Shaders 157 may include any shaders necessary to correctly shade object geometry 154. Other data may also be stored in scene data 150, for example virtual camera parameters and camera paths.

As previously discussed, it is desirable to provide realistic lighting for a computer generated graphics rendering, or output image 128. While rasterizing renderers can provide high performance, global illumination can only be approximated. For demanding applications such as feature film rendering, high quality global illumination is required from rendering application 120.

Accordingly, rendering application 120 is any type of renderer that can provide high quality global illumination, such as a ray tracing based renderer. For example, rendering application 120 may be a streaming global illumination renderer, where all the camera rays 122 necessary for rendering output image 128 are generated and kept within memory 114. Object geometry 154 is streamed into memory 114 as individual work units or nodes, with an exemplary geometry node 124 as shown, processed against camera rays 122 using other elements of scene data 150 as desired, and freed from memory 114. Since all required processing is completed after freeing the node from memory, each geometry node 124 of object geometry 154 needs to be accessed at most once, and may also be skipped if the geometry node is not visible in the current scene. The above streaming of object geometry 154 is repeated for as many global illumination passes as required, for example 2-4 passes. Since performing only one pass is equivalent to ray casting, at least two passes are required in one configuration.

Since each geometry node 124 is an individual work unit and can be processed without dependencies from other geometry nodes, servers 145a, 145b, and 145c may also be utilized for distributed parallel processing. Servers 145a, 145b, and 145c may contain components similar to those of workstation 110. SIMD (single instruction, multiple data) instructions on processor 112 and shaders on GPU 116 may be utilized to further enhance parallelism. Hierarchical traversal across camera rays 122 and object geometry 154 may also be utilized to reduce the number of intersection comparisons required.

While high quality global illumination can be provided by using a ray tracing based renderer for rendering application 120, interactive visualization of lighting changes is still difficult to provide since scene data 150 must be re-rendered if lighting 155 is modified. Since the re-rendering process requires significant time and resources, artists and directors cannot quickly visualize different lighting configurations for optimizing artist-directed lighting in a scene. While some techniques are applicable to accelerate the re-rendering process, such techniques often only affect limited portions of the scene and can only provide a lower quality visualization compared to a final quality rendering.

Accordingly, the recording of light propagation data 160 is proposed for rendering application 120. While rendering application 120 is tracing output image 128 for the first time, the light propagation records of camera rays 122 are recorded as propagation records 164 within light propagation data 160. Additionally, all emission samples and radiance samples are tracked and stored as emission samples 162 and radiance samples 163, respectively. While camera rays are utilized in FIG. 1 for simplicity, alternative embodiments may also use camera cones or other shapes for cone tracing or other shape tracing. Intermediate sums for each pass of a multi-bounce global illumination rendering may also be stored within light propagation data 160 for filtering between bounces.

When emission samples 162 and therefore lighting 155 is adjusted, then output image 128 can be reconstructed by streaming emission samples 162 through propagation records 164, bypassing a re-rendering of scene data 150. Relighting of scene data 150 can therefore be carried out orders of magnitude faster than a straightforward re-rendering. Since the streaming of emission samples 162 through propagation records 164 is essentially a streaming multiply-and-add operation amenable to parallel processing rather than a recursive algorithm, rendering application 120 can relight at interactive rates by utilizing parallelism available to processor 112 and/or GPU 116, allowing artists and directors to immediately visualize lighting changes in full final rendering quality.

For example, assuming a target render size of approximately 2 megapixels for high definition or Full HD (1920 by 1080) video, and assuming a desired sampling of 100 samples per pixel to provide sufficient data for filtering, approximately 200 million propagation records are required per global illumination bounce pass. Assuming each record occupies 20 bytes and assuming four (4) global illumination bounce passes, approximately 16 gigabytes of memory is required from memory 114, an amount easily allocated for a modern server or even a high-end consumer class desktop computer. If insufficient memory is available, high speed local storage such as solid state disks and/or RAID arrays may also be utilized.

Figure 2:
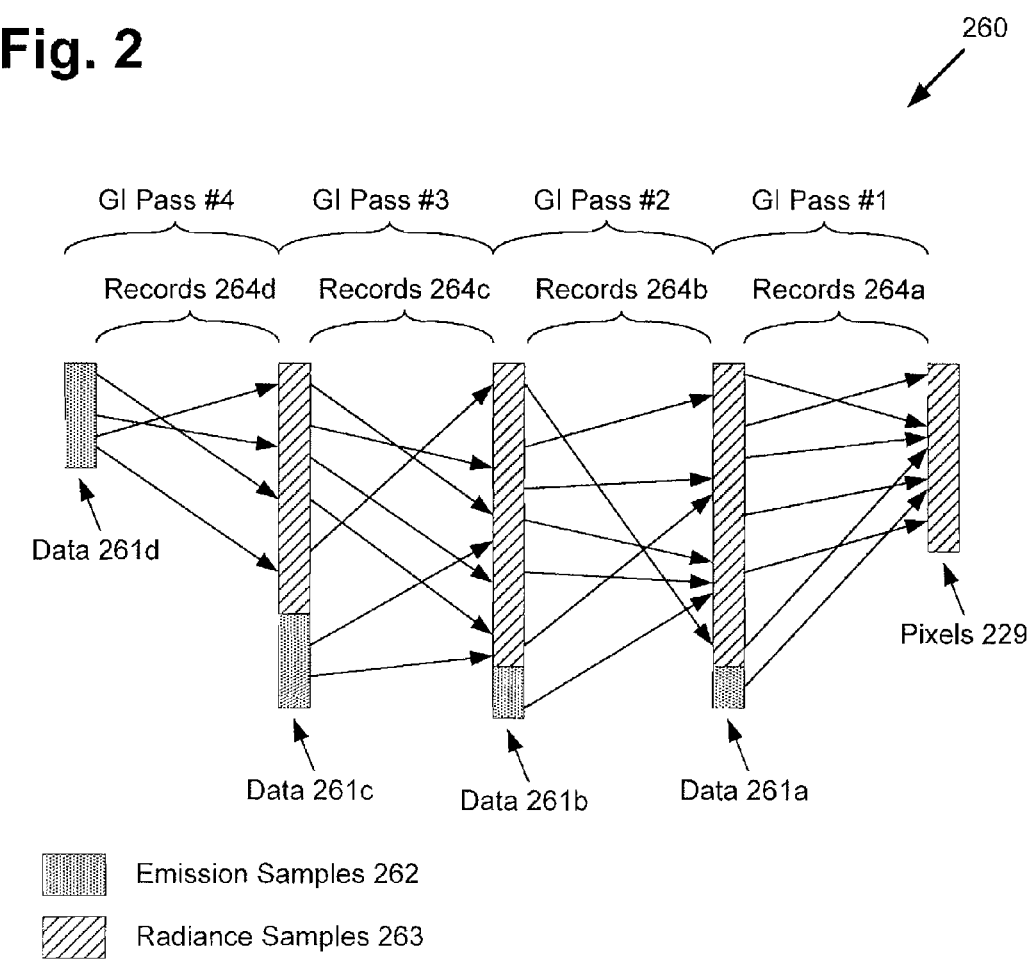
FIG. 2 presents an exemplary diagram of a data structure for light propagation data.

FIG. 2 presents an exemplary diagram of a data structure for light propagation data. Light propagation data 260 of FIG. 2 includes data 261a, 261b, 261c, and 261d, which include emission samples 262, radiance samples 263, records 264a, 264b, 264c, and 264d, and pixels 229. With respect to FIG. 2, light propagation data 260 may correspond to light propagation data 160 from FIG. 1. Emission samples 262 may correspond to emission samples 162 from FIG. 1. Pixels 229 may correspond to pixels of output image 128 of FIG. 1. It should be noted that the depiction of light propagation data 260 in FIG. 2 is only a schematic simplification as each data set and record group may potentially contain hundreds of millions of records.

Light propagation data 260 shows an exemplary recording from four (4) global illumination bounce passes. Accordingly, data 261d corresponds to samples from a fourth pass, data 261c corresponds to samples from a third pass, data 261b corresponds to samples from a second pass, and data 261a corresponds to samples from a first pass. Data 261d contains only emission samples 262 as data 261d corresponds to samples from a final global illumination bounce pass. More specifically, since no further bounces are generated on the final pass, all samples must be emissive by definition since they do not rely on other samples. Data 261c, 261b, and 261a may each include a mix of emission samples 262 and radiance samples 263, as shown. Finally, pixels 229, which may correspond to pixels of a final output image 128, includes only radiance samples 263, as the pixels must be derived from the tracing.

Rendering application 120 can record light propagation data 160 including emission samples 162 as emission samples 262 and propagation records 164 as records 264a, 264b, 264c, and 264d. The remaining radiance samples 263 can be derived from this minimal data set. However, to support filtering between bounces, the intermediate sums from radiance samples 263 may be optionally recorded as well. To implement the recording of light propagation data 160 in rendering application 120, shaders 157 may include a data recording shader executed for each bounce of camera rays 122 in rendering application 120, thereby recording light propagation data 160 while generating output image 128.

More specifically, each of emission samples 262 and radiance samples 263 may correspond to a record containing a color value, such as a red, green, blue (RGB) value. Records 264a-264d may associate source points and destination points in scene data 150 to emission samples 262 or radiance samples 263. The records may also be segmented according to the associated global illumination (GI) bounce pass. For example, data 261d and records 264d may be segmented into a data structure corresponding to GI pass #4, whereas data 261a and records 264a may be segmented into another data structure corresponding to GI pass #1, as shown. The segmentation may be implemented in the data recording shader, as discussed above.

To improve data coherency for multiple relighting operations, data 261a, 261b, 261c, and 261d may be sorted, for example by source point or destination point. Since a large number of records may need to be sorted, GPU 116 may be utilized for accelerated sorting. For example, the high performance RadixSorting algorithm can sort over 1G keys per second on a modern CUDA compatible GPU. See, "Radix-Sorting, High performance GPU radix sorting in CUDA", available from http://code.google.com/p/back40computing/wiki/RadixSorting.

FIG. 3 presents an exemplary flowchart illustrating a method for providing streaming light propagation. Flowchart 300 begins when processor 112 of workstation 110 records propagation records 164 in a scene represented by scene data 150 (block 310). As previously discussed, this may be carried out by attaching a data recording shader within shaders 157, causing rendering application 120 to update propagation records 164 as camera rays 122 are bounced in the scene rendering. Rendering application 120 may also be directly modified to record propagation records 164. As previously discussed, as long as rendering application 120 is based on a tracing renderer providing high quality global illumination, any suitable renderer may be utilized, including cone tracers and others. After the rendering is finished, the recorded propagation records 164 may appear similar to records 264a-264d as shown in light propagation data 260 of FIG. 2. As previously discussed, the recording of the propagation records may also be segmented according to GI bounce pass, and the records may be sorted by source or destination index for improved data coherency.

Next, processor 112 of workstation 110 determines emission samples 162 in scene data 150 (block 320). Turning to FIG. 2, this is equivalent to determining emission samples 262. For example, the data recording shader may be further configured to also update emission samples 162 if an intersection sample requires no further bounces, indicating a light emission sample. As previously discussed, radiance samples 263 may also be recorded by the data recording shader to assist in filtering between bounces. Similar to the propagation records, the data samples may also be segmented according to GI bounce pass, as shown in FIG. 2.

Next, processor 112 of workstation 110 edits emission samples 162, corresponding to emission samples 262 in FIG. 2 (block 330). For example, rendering application 120 may present a graphical user interface on display 118, allowing user 130 to adjust the lighting via input device 135. Thus, user 130 may modify emission samples 262, for example by changing light intensity and/or RGB color values. User 130 may even move or add new light sources to emission samples 262, as long as the new or moved light sources do not require absorbing or scattering that would invalidate the other existing records 164. To accommodate any newly updated or added light sources in emission samples 262, light propagation records 164 may be intersected with emissive geometry in scene data 150 to determine all responsive record updates for propagation records 164. Accordingly, user 130 can flexibly adjust the lighting of the scene to produce art driven lighting effects.

Additionally, user 130 can flexibly generate effects, mattes, and arbitrary output variables (AOVs) by selecting specific paths for modification. As non-limiting examples, paths intersecting with particular objects or geometry, paths hitting particular light sources, and paths within a specific global illumination pass may be targeted. Since all possible paths are recorded in propagation records 164, the selection of specific paths for mattes and AOVs is greatly facilitated. Further, user 130 can specify radiance filters applied to selected paths that may adjust radiance values for specific regions of scene data 150. For example, a color correction or color conversion filter may be provided to modify radiance values for a specific object.

Next, processor 112 of workstation 110 generates output image 128 containing pixels 229 by propagating the edited emission samples 162, corresponding to emission samples 262, through propagation records 164, or records 264a-264d (block 340). Example pseudocode is as follows:

```
Initialize array D with edited emission samples;
For (I = last GI pass; I--; I > 0) {
    For each record R in segmentation P[I] {
        D[R.destinationIndex][I-1] += D[R.sourceIndex][I]
            * R.amount;
}}
```

Using light propagation data 260 from FIG. 2 as an example, the above pseudocode would first begin by initializing an array D with emission samples 262, as edited by user 130. This step would already be completed in steps (320) and (330) above. For simplicity, an array D is assumed that has sufficient memory allocation for all possible samples in the scene; however, an actual implementation may use sparse arrays, linked lists, tree hierarchies, hash tables, and/or other data structures. The remaining values in array D, which include values to be populated with radiance samples 263, are initialized to a default value, such as zero.

The outer loop iterates from the last GI pass to the first GI pass. Thus, the GI pass index I begins at GI Pass #4 (last GI pass) and decrements (I−) until GI pass #1 is processed (I>0), after which the loop finishes. The inner loop iterates through each record R within the present segmentation P[I]. For example, since index I begins at GI Pass #4, the inner loop may first begin by processing each record R in segmentation P[4], or records 264d in FIG. 2.

The processing for a particular record R proceeds by retrieving the RGB color value for the source point in R (D[R.sourceIndex][I]), multiplying it by the percentage indicated by the propagation amount in R (R.amount), and adding the result to the RGB color value for the destination point in R (D[R.destinationIndex][I−1]). As shown in FIG. 2, D[R.sourceIndex][I] refers to values in data 261d, whereas D[R.destinationIndex][I−1] refers to values in data 261c. Note that the use of the += operator preserves any existing value that may be at the destination, since multiple records may accumulate to the same destination.

Since there are no data dependencies, and since writes to the same destination are easily resolved by simple addition, the streaming multiply-and-add operation of the inner loop in the above pseudocode algorithm is highly amenable to parallelism available to processor 112, GPU 116, and servers 145a-145c, allowing for fast calculation of pixels 229 in interactive time. Thus, user 130 is enabled to adjust, move, or add to emission samples 162 and quickly observe the resulting lighting changes to output image 128, which may be shown on display 118. Advantageously, the relighting of output image 128 can be provided at full final render quality and automatically accounts for all possible lighting effects supported by rendering application 120. Alternatively, to provide even faster results for real-time or near real-time feedback, rendering quality may be reduced using approximations or smaller data sets.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A computing device for providing streaming light propagation, the computing device comprising:
   a processor configured to:
      record a plurality of light propagation records in the scene;
      determine a plurality of light emission samples in the scene;
      edit the plurality of light emission samples by changing at least one of light intensity and red, green, blue (RGB) color values to provide a plurality of edited light emission samples;
      generate an output image by propagating the plurality of edited light emission Samples through the plurality of light propagation records, wherein the plurality of light propagation records each includes a source point and a destination point associated with emissive and radiance samples in the scene.

2. The computing device of claim 1, wherein the editing of the plurality of light emission samples further intersects the plurality of light propagation records with emissive geometry in the scene to determine updates to the plurality of light propagation records in response to an adding or a moving of the plurality of light emission samples.

3. The computing device of claim 1, wherein the processor is further configured to generate a matte or an arbitrary output variables (AOV) by selecting specific paths in the plurality of light propagation records.

4. The computing device of claim 1, wherein the processor is further configured to apply a radiance filter to selected paths of the plurality of light propagation records.

5. The computing device of claim 1, further comprising a memory, wherein the processor is configured to record the plurality of light propagation records in the memory.

6. The computing device of claim 1, wherein the processor is further configured to show the output image on a display.

7. The computing device of claim 1, wherein the propagating is by a streaming multiply-and-add operation.

8. A method for providing streaming light propagation for use by a computing device having a processor, the method comprising:
- recording, by the processor, a plurality of light propagation records in a scene;
- determining, by the processor, a plurality of light emission samples in the scene;
- editing, by the processor, the plurality of light emission samples by changing at least one of light intensity and red, green, blue (RGB) color values to provide a plurality of edited light emission samples;
- generating, by the processor, an output image by propagating the plurality of edited light emission samples through the plurality of light propagation records, wherein the plurality of light propagation records each includes a source point and a destination point associated with emissive and radiance samples in the scene.

9. The method of claim 8, wherein the editing of the plurality of light emission samples further intersects the plurality of light propagation records with emissive geometry in the scene to determine updates to the plurality of light propagation records in response to an adding or a moving of the plurality of light emission samples.

10. The method of claim 8, further comprising:
generating a matte or an arbitrary output variables (AOV) by selecting specific paths in the plurality of light propagation records.

11. The method of claim 8, further comprising:
applying a radiance filter to selected paths of the plurality of fight propagation records.

12. The method of claim 8, wherein the recording of the plurality of light propagation records is into a memory.

13. The method of claim 8, further comprising:
showing the output image on a display.

14. The method of claim 8, wherein the propagating is by a streaming multiply-and-add operation.

15. A system for providing streaming light propagation, the system comprising:
- a display;
- a computing device comprising a memory and a processor configured to:
  - record, in the memory, a plurality of light propagation records in a scene;
  - determine a plurality of light emission samples in the scene;
  - edit the plurality of light emission samples by changing at least one of light intensity and red, green, blue (RGB) color values to provide a plurality of edited light emission samples;
  - generate an output image for showing on the display by propagating the plurality of edited light emission samples through the plurality of light propagation records, wherein the plurality of light propagation records each includes a source point and a destination point associated with emissive and radiance samples in the scene.

16. The system of claim 15, wherein the editing of the plurality of light emission samples further intersects the edited plurality of light emission samples with the scene to update the plurality of light propagation records, enabling an adding or a moving of the plurality of light emission samples.

17. The system of claim 15, wherein the processor is further configured to generate a matte or an arbitrary output variables (AOV) by tracking specific paths in the plurality of light propagation records.

18. The system of claim 15, wherein the processor is further configured to apply a radiance filter to selected paths of the plurality of light propagation records.

19. The system of claim 15, wherein the processor is further configured to show the output image on the display.

20. The system of claim 15, wherein the propagating is by a streaming multiply-and-add operation.

* * * * *

UNITED STATES PATENT AND TRADEMARK OFFICE
CERTIFICATE OF CORRECTION

PATENT NO. : 9,053,582 B2
APPLICATION NO. : 13/493948
DATED : June 9, 2015
INVENTOR(S) : Burley et al.

It is certified that error appears in the above-identified patent and that said Letters Patent is hereby corrected as shown below:

In the claims,

Column 6, line 57, claim 1, "records in the scene;" should be changed to --records in a scene;--

Column 6, line 66, claim 1, "emission Samples" should be changed to --emission samples--

Signed and Sealed this
Eighteenth Day of August, 2015

Michelle K. Lee
*Director of the United States Patent and Trademark Office*